Patented Sept. 18, 1928.

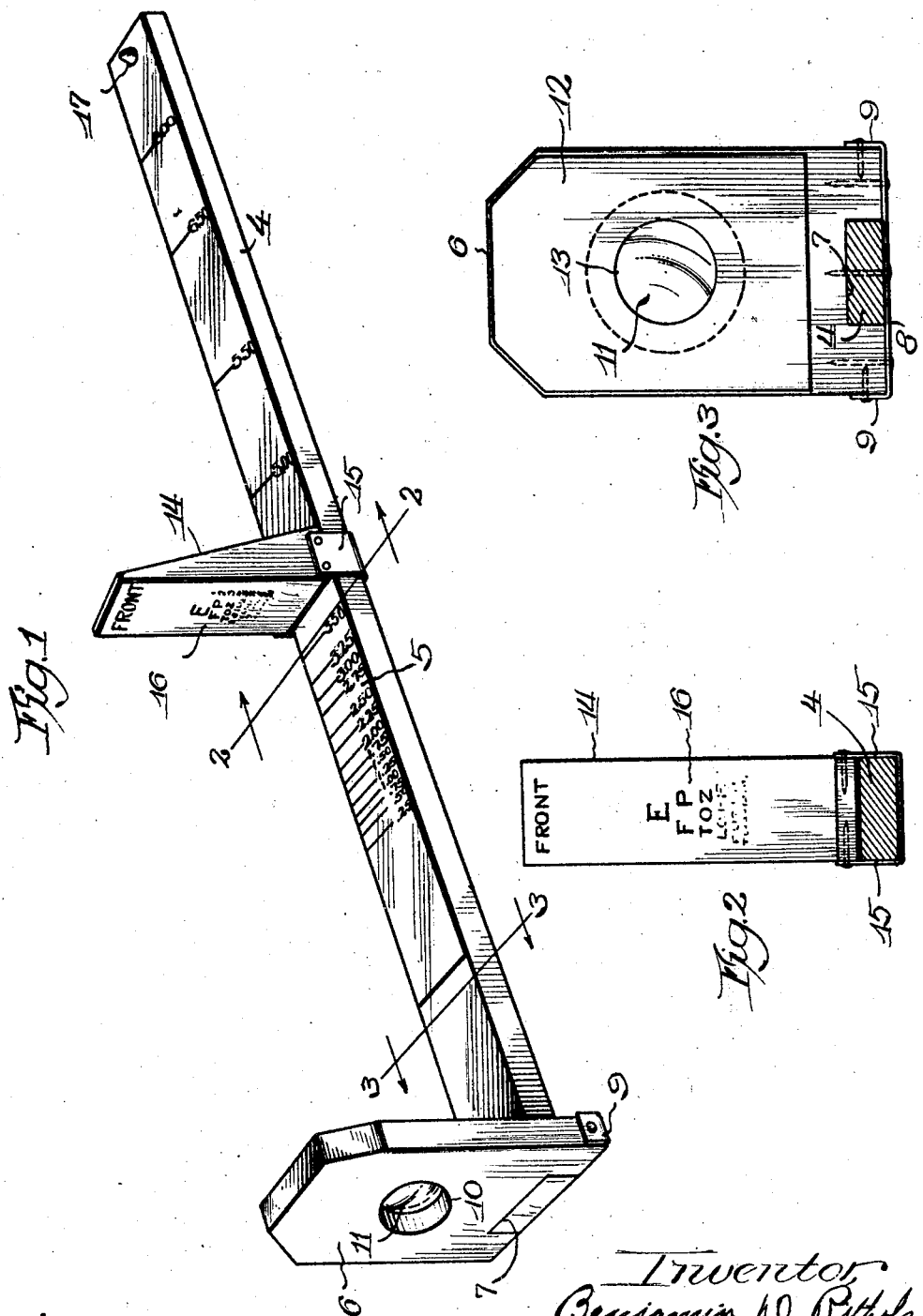

1,684,555

UNITED STATES PATENT OFFICE.

BENJAMIN D. RITHOLZ, OF CHICAGO, ILLINOIS, ASSIGNOR TO NATIONAL WATCH & JEWELRY CO., OF CHICAGO, ILLINOIS, A CORPORATION OF ILLINOIS.

EYE TESTER.

Application filed September 17, 1926. Serial No. 136,093.

This invention relates to eye testing devices and its object is to provide a novel device of simple construction which can be easily operated for testing eyes so that any individual may determine the information necessary to enable an optician to make the proper lenses for correcting defects of sight.

And a further object of the invention is to produce an accurate device of such simplicity that it can be manufactured at low cost and furnished without charge to individuals for testing their own eyes.

In the accompanying drawings illustrating the invention:

Fig. 1 is a perspective view of the testing device.

Fig. 2 is a sectional view on the line 2—2 of Fig. 1.

Fig. 3 is a sectional view on the line 3—3 of Fig. 1.

Referring to the drawings 4 is a slide bar preferably oblong in cross section and provided on its top face with a scale 5 graduated by lines and figures. A lens holder 6 is mounted rigidly on one end of the slide bar, being recessed at 7 to receive the slide bar, and a metal strip 8 is fastened by small nails to the bottom of the lens holder over the slide bar. The ends 9 of the strip may be bent up and secured to the sides of the lens holder as shown in Fig. 3. The lens holder is provided with an opening 10 at the back of which a lens 11 is secured by a sheet 12 of paper fastened to the back face of the lens holder and provided with an opening 13 to register with the opening 10. Thus the lens is secured to the lens holder in a simple but secure manner and in a position where the lens will be protected by the holder in shipping and in using the device.

A slide block 14 is mounted to slide freely back and forth on the slide bar and it is held in proper position on the slide bar by a metal strip 15 bent in the form of a yoke embracing the slide bar and secured by small nails to the sides of the slide block. This slide block is provided on its front face opposed to the lens with a chart 16 comprising lines of letters in type of different sizes similar to charts which are customarily used by optometrists. The chart 16 and the scale 5 may be printed directly upon the wood but I prefer to print the same on white paper and paste the paper upon the wood slide bar and the wood slide block so that the lines and figures and letters can be readily distinguished in the particular operation of the device and mistakes thereby avoided. A stop 17 is provided on the slide bar to limit the movement of the slide block away from the lens.

The lettering on the slide block and the lines and figures on the slide bar bear certain definite relation to each other, according to the principle of optometry and any ordinary individual can, with the use of this device, measure his range of vision and ascertain the measurements necessary to enable lenses to be made for correcting any defects of vision. It is necessary to make the device inexpensive but with absolute accuracy so that the measurements reported may be relied upon. It is the object to make the device in a form capable of being produced at such low cost that no great loss will be suffered if the customer fails to return the device after measuring his vision. It is not only necessary to make the device in a form which can be manufactured at low cost, and which will accurately measure the range of vision, but it must be made in a form which is not liable to be damaged easily in shipment or when handled inexpertly. The invention as embodied in the device herein shown and described responds to all of these requirements and provides a device which can be manufactured at low cost, which can be easily used by an inexperienced person to measure his range of vision, and which is not liable to damage under ordinary conditions of parcel post or other shipping facilities and such handling as would be given by inexperienced individuals. The front face of the slide block is flat and perpendicular to the top face of the slide bar which is sufficiently broad to afford a substantial bearing for the yoke 15. The strip forming this yoke is of sufficient width to engage the bottom face of the slide bar and the sides of the slide block and since the ends of the yoke are fastened to the slide block the latter will always be held in its proper position with relation to the top face of the slide bar. I prefer to mount the slide block on the slide bar so that it can be moved freely on the slide bar. This has the further advantage of avoiding damage to the paper strip which is pasted on the top face of the slide bar, or to the markings on the slide bar.

I have shown the invention in a simple form which has been produced for practical commercial use, but it may be desirable to change the details of construction in some respects and therefore I reserve the right to make all such changes as fall within the scope of the following claim:

I claim:

An eye testing device comprising a slide bar oblong in cross section, a lens holder having an opening and a recess therein, a lens at the rear end of the opening, a paper sheet having an opening therein to register with the lens and the opening in the holder and affixed to the holder to secure the lens in place, a slide bar having its end seated in said recess, a strip secured to the bottom of the holder over the end of the slide bar and to the slide bar, and a chart carrying slide block mounted on the slide bar.

BENJAMIN D. RITHOLZ.